United States Patent [19]

Hsiao

[11] 3,930,167

[45] Dec. 30, 1975

[54] IN-LINE PRODUCTION CONTROL OF POLYMERIC FILM

[75] Inventor: Chih C. Hsiao, St. Paul, Minn.

[73] Assignee: The Reagents of the University of Minnesota, Minneapolis, Minn.

[22] Filed: May 4, 1973

[21] Appl. No.: 357,105

[52] U.S. Cl............ 250/572; 350/162 SF; 356/108; 356/161
[51] Int. Cl.²......................................... G01N 21/32
[58] Field of Search ...... 250/206, 219 WE, 219 DF, 250/219 FR; 350/162 SF; 356/71, 156, 106, 159, 168, 164, 108, 161, 201, 202, 203, 239

[56] References Cited
UNITED STATES PATENTS

| 3,319,515 | 5/1967 | Flournoy | 356/108 |
| 3,552,856 | 1/1971 | Schwallie | 350/162 SF |
| 3,614,232 | 10/1971 | Mathisen | 250/219 DF |
| 3,633,037 | 1/1972 | Langenbeck | 250/219 WE |
| 3,643,101 | 2/1972 | Shipp | 350/162 SF |
| 3,657,727 | 4/1972 | Blevins | 250/219 DF |
| 3,664,750 | 5/1972 | Hock | 350/162 SF |
| 3,746,455 | 7/1973 | Flamholz | 356/168 |

Primary Examiner—James W. Lawrence
Assistant Examiner—D. C. Nelms
Attorney, Agent, or Firm—Burd, Braddock & Bartz

[57] ABSTRACT

A method of utilizing a laser beam by transmission thereof through plastic polymeric film as it is being produced, followed by comparison of the diffraction thereof with a predetermined quality control standard which, through computerization and optimization and through automatic sensing and signalling systems can detect any differences between the immediate readout and the control and translate the difference in terms of varying different phases of the production system so that one or more production variables will be varied so that the final end product will substantially correspond to the predetermined desired standard specification.

27 Claims, 4 Drawing Figures

IN-LINE PRODUCTION CONTROL OF POLYMERIC FILM

In the present production of plastic polymeric film, there is virtually no in-line control of the production system to detect variations from a predetermined standard in the in-process material. Existing systems involve running a given amount or batch of material and at the end of any given production run performing a quality control test on a portion or sample of the completed manufactured end product to determine if it meets the pre-established specifications. If the quality control sample fails to meet the standard specifications, the entire production run must either be destroyed or recycled. This obviously is expensive and time consuming, being expensive not only in the wasted material and depreciation of dies and machinery required to produce the product, but it is also costly in the extra man hours required for the reruns and can also be expensive if failing to meet production needs in terms of filling the customers order on time.

Although the specific form of the invention disclosed herein is directed to the use of laser beams to study polymeric film, the broadest concept of the invention embodies the use of other light sources (preferably non-destructive) with other kinds of material to determine structural and molecular variations of in-process material and simultaneously correct or adjust one or more controllable variables or parameters in the production system to assure that the final end product will meet the desired specifications or standards.

In polymeric plastic film, the molecules can be oriented in an almost infinite variety of ways. The type of orientation determines to a large extent the physical characteristics of the film. Laser Light, when passed through polymeric film, is diffracted, with the type of pattern of diffraction depending upon the type of molecular orientation in the product of any given time.

It is therefore one objective of this invention to use a non-destructive light diffraction technique embodying laser beams which utilizes the internal molecular structure as a guide to detect and overcome unwanted qualities or characteristics or defects in the final end product, which beams are transmitted through plastic film while it is in the process of manufacturing, and by so doing, varying the production or parameters to assure a uniform end product meeting standard or pre-established specifications.

Another objective is to study laser diffraction patterns or characteristics of the in-process material throughout the various steps or stages of manufacturing of said film so as to detect as early as possible in the system the need for any change in the production variables or parameters to assure that only end product meeting the pre-established specifications will be produced. Any differences in the diffraction, including variation in intensity, geometry, or configuration are utilized for controlling the various production devices or variable parameter as the film stretching mechanism, the heating and the cooling units, and any rollers or presses used to establish the thickness of the film. Computerization and optimization of the process conditions so as to respond to any variations in the defraction patterns or characteristics provides a continuous production of uniform quality film meeting the pre-established specifications.

These and other objects will be better understood from a reading of the following description made in conjunction with the attached drawing, and in which.

The molecular orientation in the film depends on a number of variables or parameters including the degree of stretch, the direction of stretching, and the temperature, which aforementioned variables are probably the most important in affecting the quality of the end product, although other variables may also be involved.

The orientation of the molecules and the temperature thereof effect the light diffraction so that by a preliminary study of the condition of a quality control specimen, meeting the desired final specifications or standards, the pattern of light difraction can be predetermined for any given condition of the film or stage of development. Based on this knowledge, the laser beams can be used during production to evaluate the light diffraction pattern or characteristics to help in preparing the film to meet the pre-established standard. Through recording or sensing means, and controls, any variation from the standard can be passed back into the system so that the system will automatically adjust itself to the optimum necessary to produce film meeting the pre-established standards or specifications.

Figure 3:
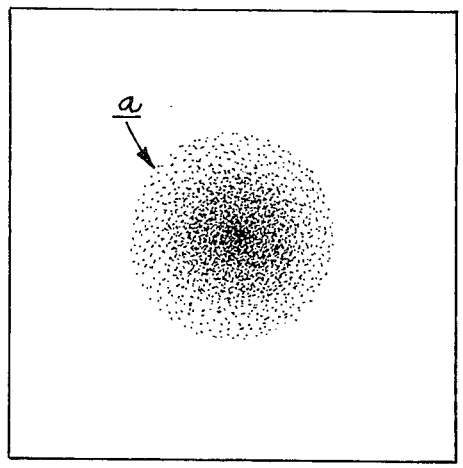
FIG. 3 is a plan view of such a screen with a typical laser light pattern thereon resulting from a substantially uniform random molecular orientation in the film.

As an example of the diffracted laser light beam patterns that are developed and the changes therein due to changing conditions in the film, attention is directed to FIG. 3, in which is illustrated a light pattern *a* produced by a laser beam transmitted through a piece of plastic film in which the molecules are substantially uniformly, randomly oriented. The generally circular pattern illustrated is typical of such a condition.

Figure 4:
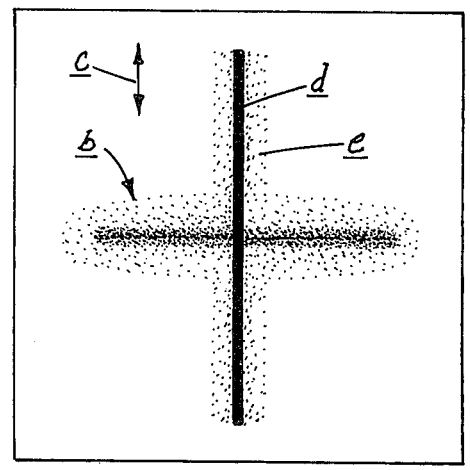
FIG. 4 is a plan view of a screen with a diffracted light pattern caused by a "stretched" molecular orientation, and of diffracted light patterns resulting from the "crazing" or "cracking" of the film surface.

As the film is stretched, the molecules tend to become oriented in the direction of stretching, and this is reflected by a change in the defracted light pattern *b* in FIG. 4. It should also be noted at this point that the longitudinal orientation of the pattern of stretched film is 90° out of phase with the orientation of the molecules themselves. Thus, the horizontal orientation of pattern *b* indicates that the molecules themselves are, in fact, vertically oriented in the direction of arrows *c*.

If surface crazing is present, the crazing will create a readily indentifiable and different pattern such as that illustrated by pattern *d* on the screen. If the film is brittle, the cracks will produce a light pattern *e* on the screen. Additional factors such as temperature and thickness will cause a change in the pattern in a sufficiently predictable manner so that virtually all possible film conditions through the study of the various diffracted light patterns can be determined by means of a suitable mathematical equation to determine optimum conditions and in order to computerize the process Since the condition of the film at any time can and normally does depend upon more than one of the variables, it is best if the inter-relationship between all the variables is obtained as a whole and then optimized for the process at any stop or stage of development. This can be accomplished by first setting up the governing equation and then solving it by the use of computers.

Figure 1:
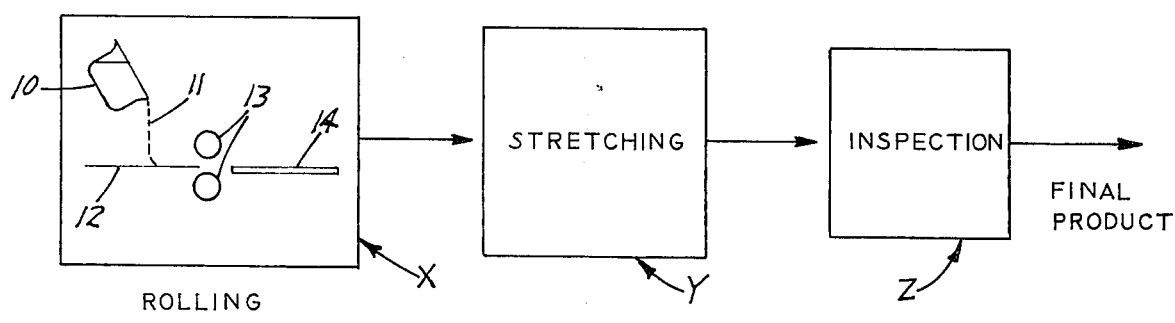
FIG. 1 is a schematic sketch of a portion of a film producing system embodying this invention.

Referring to the drawings, FIG. 1 is a schematic presentation of a part of a film production system involving this invention which generally relates some of the production parameters or variables with the in-line control system of this invention.

Thus, station X illustrates the initial formation of the plastic film, in which a source 10 of molten plastic 11 feeds the molten plastic to an endless belt 12 which passes the material through rollers 13 to form the initial sheet or strip 14 of plastic film. The material must be translucent or transparent (light pervious) in order that the inspection and control system of this invention can be used.

The film 14 is then passed along a predetermined path of travel to a stretching station Y, where it is stretched by any suitable means in whatever direction desired to obtain the direction and degree of molecular orientation necessary to make the type of plastic film desired.

After stretching, the film may then travel to an inspection or detection station Z, where the light inspection and control of this invention takes place.

Figure 2:
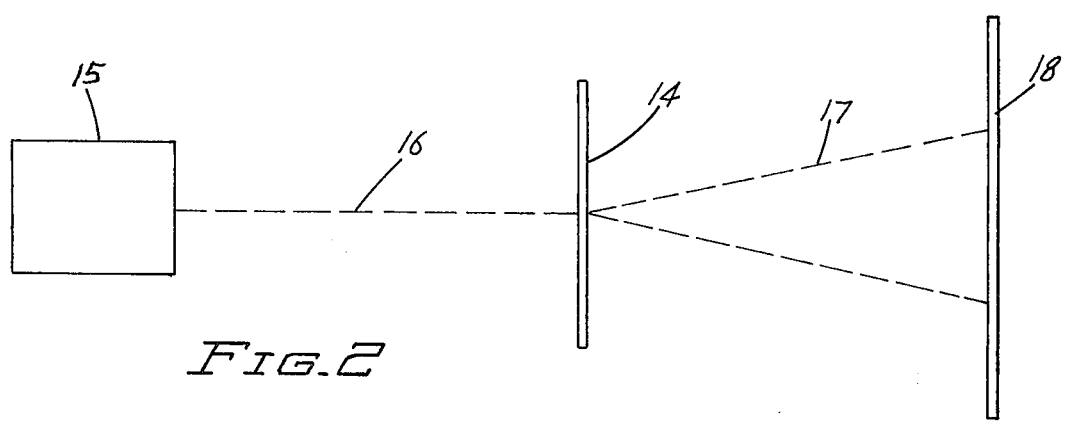
FIG. 2 is a schematic view of a portion of the detection or inspection system of this invention being used in conjunction with a film production system showing a laser beam being passed through polymeric film and diffracted onto a screen.

FIG. 2 offers a schematic presentation of what may take place at inspection and detection station Z. In FIG. 2, a source of light 15 (preferably laser beams) is provided. It sends a beam 16 of light through a portion of the light pervious plastic polymeric film 14, which film can represent the film at any step in the process of making same. As the light is transmitted through the film, the rays of light are diffracted as at 17, with the diffracted light pattern being imposed upon a recording means or screen 18.

The laser source 15 may be a helium-neon laser of low energy of 5 millwatts with a wave length of 6328 angstroms. The size of the beam may be on the order of 0.7 mm.

One of the most important, if not the important parameter in the production of the film is the amount of biaxial stretching of the film, which is done at station Y by mechanical means. If the film is not evenly or uniformly stretched, the molecules are not evenly oriented, and unsymmetrical properties exist in the film.

Since the light diffraction depends in part on molecular orientation, the light pattern produced is different for each type and degree of orientation. This difference is, in this invention, used in guiding the mechanism responsible for stretching the film.

Molecules become more active as they are heated, and this variation in molecular activity also produces a different pattern on the screen for each temperature level or gradient. This enables the temperature of the in-process material to be determined at any time and compared with a reference temperature, with the temperature control being adjusted according to a pre-calibrated scale.

The thickness of the film controls the intensity of the diffracted light, and a light mike or other light energy measuring device may be used to detect the difference in the diffracted light energy.

These individual diffraction differences are then computerized and optimized, and the optimum procedures are built into or connected with the processing device in such a way as to instantly correct any error or imbalance in the system.

The temperature of the molten plastic of the atmosphere surrounding the rollers, and the temperature of the rollers themselves, can all be variables or parameters which can be controlled and changed to influence the quality of the final end product, as well as other temperatures in the remainder of the production system.

The spacing and tension of the rollers are other variables which can be controlled and changed to influence the quality of the final product, as can the stretching mechanism utilized at station Y.

The production steps shown are merely illustrative for purposes of a better understanding of this invention, it being recognized that actual production conditions may involve many steps, devices, and machines not shown here, and that the controllable variables may vary in type and location from what is here illustrated and described.

It should also be recognized that no effort has been made in this disclosure to illustrate or describe the actual control means used between the recording or sensing means and the mechanisms, and devices which functionally control the variables, such as the rolling and stretching devices, on the temperature controls. Any such suitable control means can be used within the broad concepts of this invention, so long as they are capable of translating the differences in light readings between the pre-established standard and the in-line or in-process light readings into changes in the production variables which assure that the final end product will be as intended.

Thus, to briefly summarize the example of the invention herein disclosed and described, the light pervious plastic material to be made into film is initially converted to a molten state and pressed into sheet or film like formation, such as by means of the illustrated rollers. The film then travels to the stretching station Y for orientation of the molecules, and is then subjected to the inspection operation Z of this invention.

The laser beams are passed through the material, and the pattern or characteristics are recorded on the screen, and any differences between this pattern and the control pattern previously determined by light treatment of film made according to the established specifications of the desired end product are passed through the control system which automatically effects the optimum changes in the production variables to bring the in-process material back into line with the established specimens.

It will, of course, be understood that various changes can be made in the aforedescribed procedures without departing from the scope of this invention.

The various types of light patterns *a*, *b* etc. illustrated herein approximate patterns actually produced during development of this invention. However, it is recognized that other types of patterns will be produced, depending on the type and condition of material being studied, and the invention is in no way limited to any particular diffracted light pattern. Also, it will be understood that the laser light inspection can take place at various stages in the production process, wherever it is most advantageous to do so in terms of correcting any variables.

The embodiments of the invention in which an exclusive property or privilege is claimed are defined as follows:

1. A method of controlling the production of a light pervious product comprising moving the material from which said product is to be made along a pre-determined path of travel, treating said material with at least one variable means the variation of which changes the character of the final end product, transmitting a beam of light through the in-process material, causing diffraction of said light, recording the characteristics of the diffracted beams after passage through said material, comparing the recorded characteristics with the previously determined standard diffracted light characteristics of a control sample, and changing said variable means in response to any differences in the character of the in-process diffracted beams and the control sample diffracted beams to cause the inprocess material to become more like said control sample.

2. The method of claim 1, wherein said light pervious product is formed of polymeric material.

3. The method of claim 1, wherein said beam of light is a laser beam.

4. The method of claim 1, wherein said light pervious product is formed of a polymeric material, and said beam of light is a laser beam.

5. The method of claim 1, wherein said variable means is a means for stretching said material.

6. The method of claim 1, wherein said variable means is a means for varying the temperature of the in-process material.

7. The method of claim 1, wherein said variable means is a means for varying the thickness of the in-process material.

8. The method of claim 4, wherein said variable means includes means for varying the thickness of the in-process material, and means for varying the temperature of the in-process material.

9. The method of claim 1, wherein the range of variation of said variable means is determined as a function of the diffraction characteristics, and the interrelationship of said variable means and said diffraction characteristics is optimized to provide the most efficient way of adjusting the production system to produce an end-product having the desired characteristics.

10. The method of claim 1, wherein said product when produced has a predetermined molecular structure, and wherein said molecular structure is subject to variation during production, and wherein said variation in molecular structure can be changed during production by a change in said variable means, and wherein the predetermined molecular structure and the varied molecular structure provide different diffracted light characteristics, and wherein said control sample represents said predetermined molecular structure, and wherein said variable means is changed in response to a recorded difference between the diffracted light characteristics of the control sample and the in-process material.

11. The method of claim 1, wherein said light pervious product is formed of a polymeric material, and said beam of light is a laser beam, and wherein said variable means is a means for stretching said material, and wherein said variable means includes means for varying the thickness of the in-process material, and means for varying the temperature of the in-process material, and wherein said product when produced has a predetermined molecular structure, and wherein said molecular structure is subject to variation during production, and wherein said variation in molecular structure can be changed during production by a change in said variable means, and wherein the predetermined molecular structure and the varied molecular structure provide different diffracted light characteristics, and wherein said control sample represents said predetermined molecular structure, and wherein said variable means is changed in response to a recorded difference between the diffracted light characteristics of the control sample and the in-process material.

12. The method of claim 1 which includes transmitting said beam of light through the in-process material after treating said material with said variable means, changing said variable means in response to any of said differences in character prior to subsequent material being subjected to the transmission of said beam of light, and thereby causing subsequent in-process material to become more like said control sample before said subsequent material reaches said beam of light.

13. The method of claim 1, wherein said production system includes means for establishing the thickness of said film, and wherein said control means is adapted to cause a change in said thickness control means to effect a change in the operation of said thickness control means to thereby vary the thickness of said film in response to a difference in the diffracted light from the control standard.

14. The method of claim 13 wherein said means for establishing the thickness of said film includes automatic control means, and wherein the change caused by said control means effects a change in the operation of said thickness control means on subsequent in-process film.

15. A method of controlling the production of a light pervious product comprising:

preparing a control sample of said product, said sample having predetermined desired qualities, said product being adapted to diffract light transmitted therethrough, transmitting a beam of light through said control sample and recording the characteristics of the diffracted light beams after they have been transmitted through said sample causing diffraction of said light to establish a control standard, providing a system for producing said product, which system includes moving the in-process product along a predetermined path of travel, said system also including at least one variable means, the variation of which changes the character of the final form of said product, providing a light source on one side of the said path of travel, providing recording means on the opposite side of said path of travel, said source of light and said recording means being so positioned that beams from said light source can pass through said in-process material and be diffracted in such a manner that the diffraction can be recorded by said recording means, passing said in-process product along said path of travel and passing light beams from said light source through said in-process product to said recording means, and providing control means interconnecting said recording means and said variable means and adapted to automatically react to any differences between the diffracted light of said standard and the in-process material recorded by said recording means, and cause a change in any such difference.

16. The method of claim 15, wherein said light source is a laser.

17. The method of claim 16, wherein said light source is a low energy laser.

18. The method of claim 14, wherein said light source is a helium-neon laser.

19. The method of claim 15, wherein said production system includes means for stretching said film, and wherein said control means, is adapted to cause a change in the operation of said stretching means in response to a difference in the diffracted light from the control standard.

20. The method of claim 16, wherein said production system includes temperature control means, and wherein said control means is adapted to cause a change in said temperature control means to effect a change in the temperature of the production system in response to a difference in the diffracted light from the control standard.

21. The method of claim 15, wherein said product when produced has a predetermined molecular structure, and wherein said molecular structure is subject to variation during production, and wherein said variation in molecular structure can be changed during production by a change in said variable means and wherein the predetermined molecular structure and the varied molecular structure provide different diffracted light characteristics, and wherein said control sample represents said predetermined molecular structure, and wherein said variable means is changed in response to a recorded difference between the diffracted light characteristics of the control sample and the in-process material.

22. The method of claim 15, wherein said light source is a laser, and wherein said production system includes means for stretching said film, and wherein said control means, is adapted to cause a change in the operation of said stretching means in response to a difference in the diffracted light from the control standard, and wherein said production system includes temperature control means, and wherein said control means is adapted to cause a change in said temperature control means to effect a change in the temperature of the production system in response to a difference in the diffracted light from the control standard, and wherein said production system includes means for establishing the thickness of said film, and wherein said control means is adapted to cause a change in said thickness control means to effect a change in the operation of said thickness control means to thereby vary the thickness of said film in response to a difference in the diffracted light from the control standard, and wherein said product when produced has a predetermined molecular structure, and wherein said molecular structure is subject to variation during production, and wherein said variation in molecular structure can be changed during production by a change in said variable means, and wherein the predetermined molecular structure and the varied molecular structure provide different diffracted light characteristics, and wherein said control sample represents said predetermined molecular structure, and wherein said variable means is changed in response to a recorded difference between the diffracted light characteristics of the control sample and the in-process material.

23. The method of claim 15, wherein said light beams are passed from said light source through said in-process product to said recording means after said product has been subjected to said variable means, and wherein said automatic reaction to differences between the diffracted light of said standard and the in-process material recorded by said recording means causes a change in said variable means to correct any such differences in subsequent in-process material.

24. A system for making polymeric film which includes means for moving the in-process film along a predetermined path of travel, film stretching production means, temperature control production means, a source of laser light on one side of said path of travel, recording means on the opposite side of said path of travel and adapted to intercept and record the diffracted laser beams after passing through said film, and control means interconnecting said recording means and said stretching means and said temperature control means whereby said control means can selectively vary any of said production means in response to variation in the diffracted laser beam from a predetermined standard for said polymeric film.

25. The system of claim 24, wherein said product when produced has a predetermined molecular structure, and wherein said molecular structure is subject to variation during production, and wherein said variation in molecular structure can be changed during production by a change in said variable means, and wherein the predetermined molecular structure and the varied molecular structure provide different diffracted light characteristics, and wherein said control sample represents said predetermined molecular structure, and wherein said variable means is changed in response to a recorded difference between the diffracted light characteristics of the control sample and the in-process material.

26. The system of claim 24, wherein said control means can selectively vary any of said production means before subsequent in-process film reaches said source of light and recording means.

27. The system of claim 24, wherein said control means can selectively vary any of said production means on subsequent in-process film before it reaches said source of laser light.

* * * * *

UNITED STATES PATENT AND TRADEMARK OFFICE
CERTIFICATE OF CORRECTION

PATENT NO. : 3,930,167
DATED : December 30, 1975
INVENTOR(S) : Chih C. Hsiao

It is certified that error appears in the above—identified patent and that said Letters Patent are hereby corrected as shown below:

On the title page, the assignee is incorrectly shown as "The Reagents of the University of Minnesota". This should be --The Regents of the University of Minnesota--.

Column 1, line 39, "of" should be --at--.

Signed and Sealed this sixteenth Day of March 1976

[SEAL]

Attest:

RUTH C. MASON
*Attesting Officer*

C. MARSHALL DANN
*Commissioner of Patents and Trademarks*